US007241007B2

(12) United States Patent
Cody

(10) Patent No.: US 7,241,007 B2
(45) Date of Patent: Jul. 10, 2007

(54) CONVERTIBLE EYEWEAR

(76) Inventor: Thomas P. Cody, 5516 Via Olas, Thousands Oaks, CA (US) 91320

( * ) Notice: Subject to any disclaimer, the term of this patent is extended or adjusted under 35 U.S.C. 154(b) by 8 days.

(21) Appl. No.: 11/061,287

(22) Filed: Feb. 22, 2005

(65) Prior Publication Data

US 2005/0264754 A1    Dec. 1, 2005

(51) Int. Cl.
*G02C 1/00* (2006.01)

(52) U.S. Cl. .............................. 351/86; 351/47; 351/83; 351/106

(58) Field of Classification Search .................. 351/47, 351/57, 41, 86, 83, 103, 106
See application file for complete search history.

(56) References Cited

FOREIGN PATENT DOCUMENTS

JP        57-184910    * 11/1984

* cited by examiner

*Primary Examiner*—Hung Xuan Dang
(74) *Attorney, Agent, or Firm*—Elliott N. Kramsky

(57) ABSTRACT

Convertible eyewear permits ready conversion between various optical modes. A removable shield is removable secured by magnetic force to a frame by the interaction of at least one magnetic rivet recessed within the frame and at least one magnetic rivet that protrudes from the shield. The mating magnetic rivets may have contacting surfaces of oval shape with the rivet recessed within an oval-shaped channel to prevent misalignment of frame and shield with a single point of magnetic contact. A prescription lens insert and a goggle adapter, each having a protruding magnetic rivet, are compatible for magnetic fixation to the frame of the eyewear.

11 Claims, 5 Drawing Sheets

CONVERTIBLE EYEWEAR

BACKGROUND

1. Field of the Invention

The present invention relates to eyewear. More particularly, this invention pertains to eyewear that is capable of ready conversion between a number of optical modes.

2. Description of the Prior Art

Eyewear serves various functions. In addition to eyesight correction, eyewear (including, but not limited to glasses, sunglasses and goggles) often is employed to protect the eyes from dust and contaminants, wind and uv radiation. Often, it is called upon to perform a number of such functions. As conditions change (e.g. sundown, completion of skiing or other athletic activity) different types of eyewear are often required.

The relative fragility and bulkiness of eyeglasses, goggles and the like complicate the storage of multiple types for switching therebetween. This has led to the development of kits for making changes "in the field". An example is disclosed in U.S. Pat. No. 6,641,263 of Olney for "Sunglasses With Removable Sealing Member" teaches a system for converting "regular" eyeglasses to goggles. The system taught by that invention includes an adapter having a pair of apertures aligned with the lenses of the glasses. A foam gasket overlies the rear of the adapter to provide a seal between the orbital structure of the user and glasses while an air flow passageway is provided that includes a port in the center of the bridge of the frame of the eyeglasses that intersects a horizontal channel at the front surface of the adapter. The adapter is fixed in alignment with the frame of the eyeglasses by means of an array of locking means that include attachment tags at the opposed ends of the adapter and locator pins for press-fitting to corresponding recesses within the inner surface of the frame.

While providing a means for converting regular eyeglasses to goggles, the device of the Olney patent is not particularly user-friendly. The critical process of attaching and detaching the adapter to the frame is complicated by the numerous structures that must be properly engaged. Secure and exact engagement are necessary to obtain the required alignment of optical elements and their retention of precise alignment even during such device stressing activities as, for example, skiing. The numerous pins and tabs requiring precise engagement with elements of the frame demand procedures, such as the removal of gloves in cold weather, that are not consistent with sporting and other strenuous activities. Additionally, the Olney device requires flexure of the eyeglass frame upon attachment and detachment of the adapter. Such repetitive stressing of the frame is deleterious and may cause the lenses of the eyeglasses to pop out over time.

SUMMARY OF THE INVENTION

The present invention addresses the preceding and other shortcomings of the prior art by providing convertible eyewear. Such eyewear includes a frame and an optical shield that is arranged to be received in the frame.

Each of the frame and the shield has at least one magnetic rivet fixed to it with each of such magnetic rivets having at least one exposed planar surface. The magnetic rivets of the frame and the shield are arranged so that, when the shield is received in the frame, an exposed planar surface of a magnetic rivet fixed to the frame of a first magnetic polarity contacts an exposed planar surface of a magnetic rivet fixed to the shield having the opposite magnetic polarity.

The preceding and other features of the invention will become further apparent from the detailed description that follows. This discussion is accompanied by a set of drawing figures. Numerals of the drawing figures, corresponding to those of the written description, point to the various features of the invention with like numerals referring to like features throughout both the drawing figures and the written description.

BRIEF DESCRIPTION OF THE DRAWING FIGURES

FIG. 1 is a perspective view of eyewear in accordance with the invention configured as a non-prescription sunglass or the like;

DETAILED DESCRIPTION OF THE PREFERRED EMBODIMENT

Figure 1:
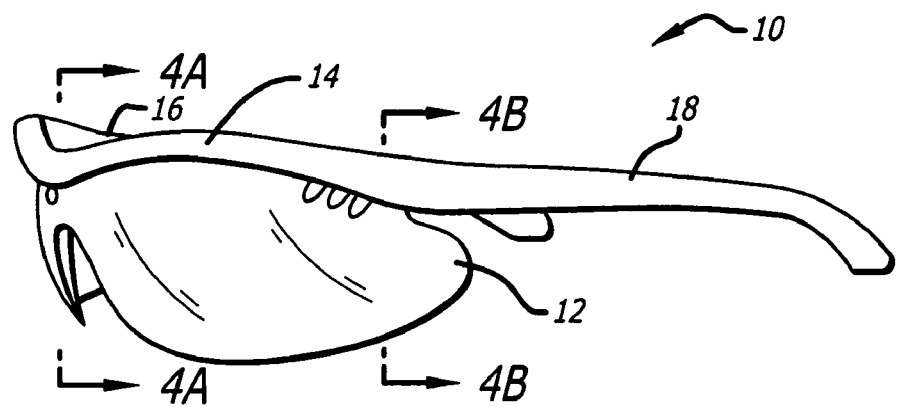
Figure 2A:
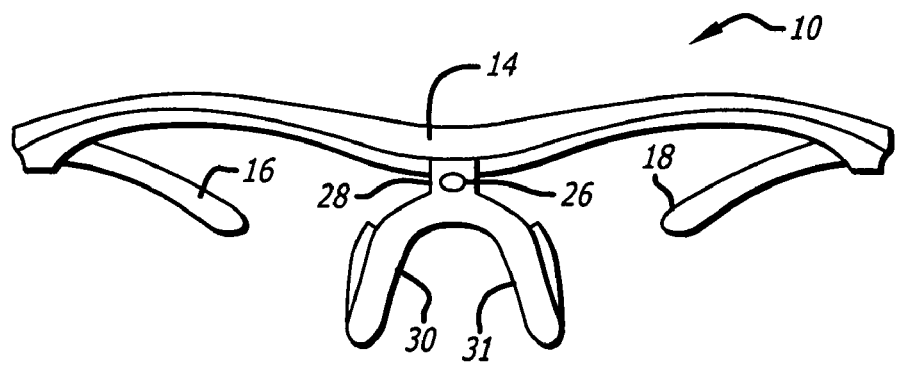
FIGS. 2A and 2B are front elevation views of a frame and an optical shield, respectively, of convertible eyewear in accordance with the invention.
Figure 2B:
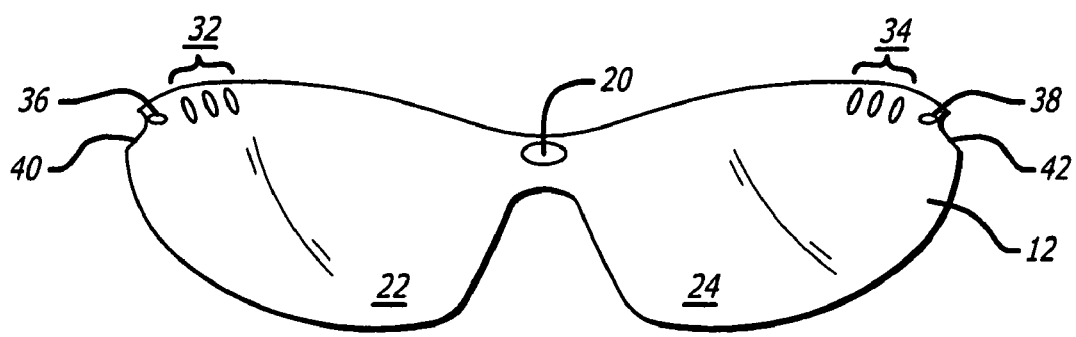

FIG. 1 is a perspective view and FIGS. 2A and 2B are front elevation views of a frame 10 and an optical shield 12, respectively, of eyewear in accordance with the invention. Referring to the figures in combination, the optical shield 12 comprises an integral sheet of optical quality plastic, preferably shaded to provide utility as a sunglass or the like. The shield 12 is supported by the frame 10 that includes an elongated central browline element 14 having temple pieces 16, 18 hingedly fixed to its opposed extrema.

A logo plate 20, for commercial product identification, is soldered to an underlying magnetic rivet (not visible in FIGS. 1, 2A and 2B) that is fixed to, and provides a portion of means for the ready attachment of the shield 12 to the frame 10. Such means permits the simple removal of an existing shield and its replacement with another having, for example, different optical properties (e.g. amber, as opposed to smoked shading, light rather than dark shading).

The shield 12 is shaped to define distinct optical regions 22 and 24 arranged to fit over the wearer's eyes. Due to the fact that it is formed of a single integral piece of material, the shield 12 is not suitable for fabrication in accordance with an individual's optical prescription. Rather, as will be seen below, the eyewear of the invention may be readily reconfigured to a prescription optical mode by the attachment of a prescription insert.

A central magnetic rivet 26 having an exposed planar surface of oval shape is recessed within a vertical bridge 28 that is integral with the central browline element 14 of the frame 10. The bridge 28 connects a nose piece comprising arms 30, 31 to the central browline element 14. The central magnetic rivet 26 will be seen to interact an oppositely-poled magnetic rivet fixed to the shield 12, discussed below.

Sets of (three) air vents 32, 34 are provided at upper portions of the optical regions 22, 24 of the shield 12 for preventing fogging of the optical shield 12 (also functions to prevent fogging of an optical adapter, discussed below) when the eyewear is worn during athletic and other strenuous activities that may generate perspiration. In addition, the sets of vents 32 and 34 are of particular importance upon conversion of the structure illustrated in FIG. 1 to a goggle configuration by the addition of a goggle adapter element, discussed below. Magnetic rivets 36, 38 are fixed to the shield 12 in the areas of the sets of air vents 32 and 34 respectively. Magnetic rivets (not shown) are correspondingly arranged and fixed to the central browline element 14 with exposed magnetic surfaces facing rearwardly. The opposed edges of the shield 12 include indentations 40, 42 for use in securing the shield 12 to the central element 14 of the frame.

Figure 3:
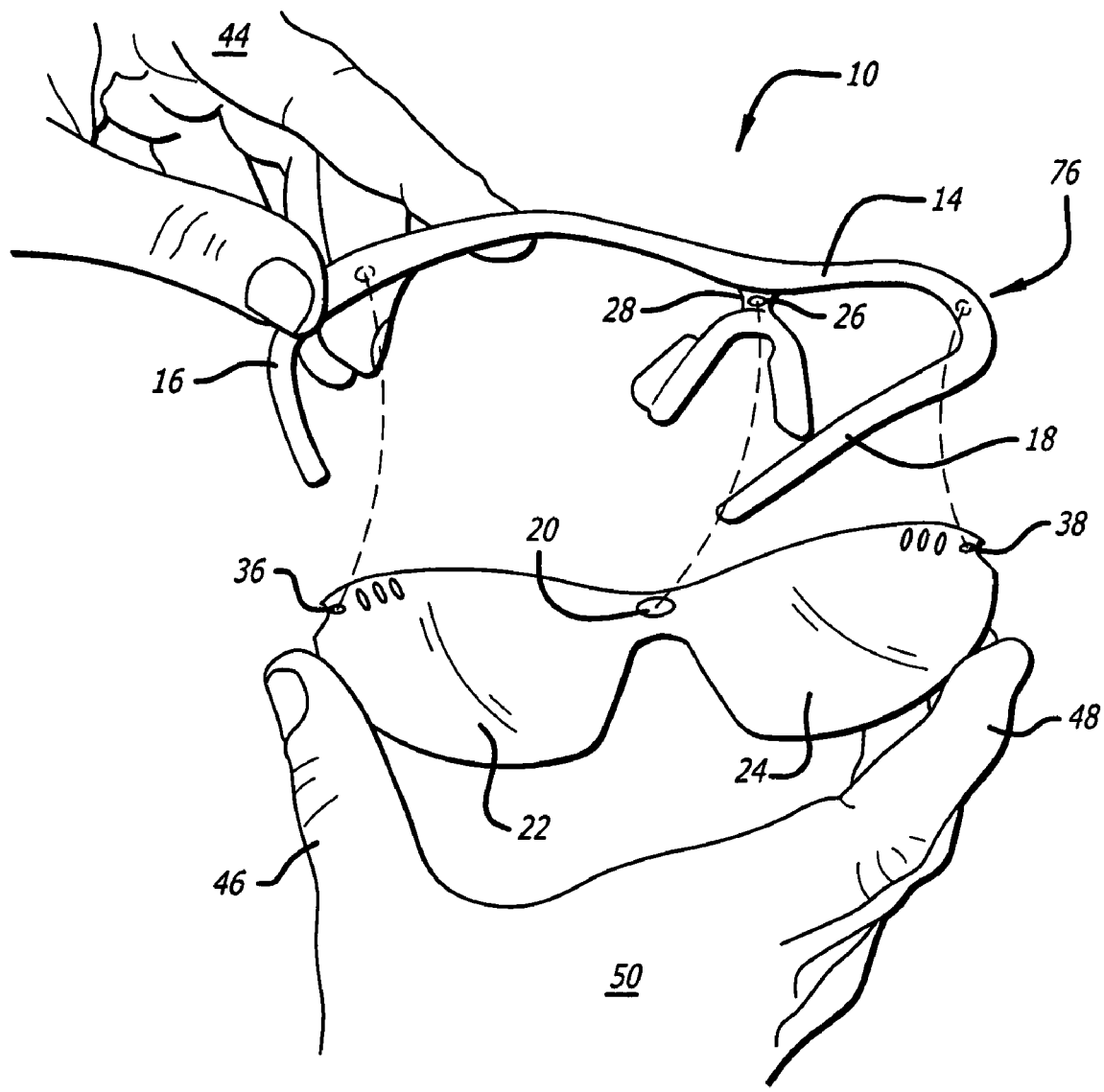
FIG. 3 is a perspective view for illustrating the ready replacement of an optical eye shield in convertible eyewear in accordance with the invention.

FIG. 3 is a perspective view for illustrating the ready attachment of the optical shield 12 to the frame 10. As can be observed one may, for example, grasp the frame 10 with one's left hand 44 and the shield 12 between the thumb 46 and forefinger 48 of one's right hand 50. The thumb 46 and forefinger 48 cooperate to bend the resilient optical shield 12 so that the shield 12 is mated to the frame 10 with the region of the shield 12 that joins the optical areas 22 and 24 in front of the bridge 28 while the regions of the optical areas 22 and 24 adjacent the magnetic rivets 36 and 38 respectively at the back of the central browline member 14 of the frame 10. This "crossover" mating of the resilient optical shield 12 to the frame 10 creates a spring force that pushes the edges of the shield 12 toward the rear surface of the central browline member 14.

Figure 4A:
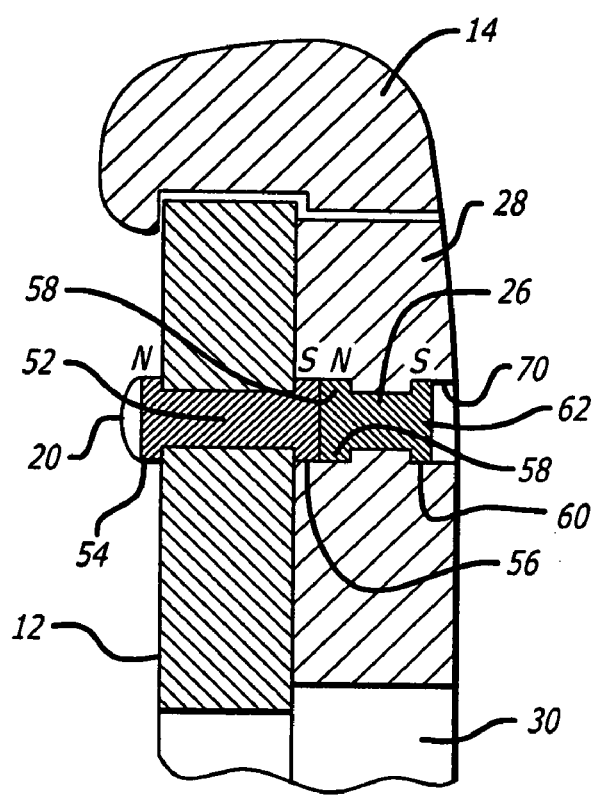
FIGS. 4A and 4B are cross-sectional views taken at lines 4A—4A and 4B—4B of FIG. 1 for illustrating the magnetic attachment of an optical shield to a frame in accordance with the invention.
Figure 4B:
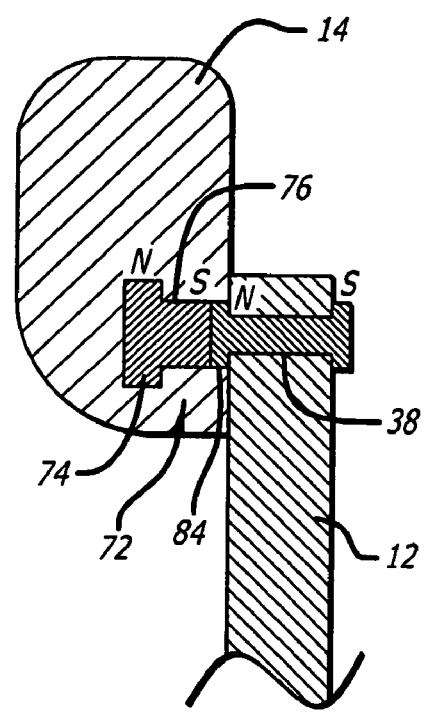
Figure 5:
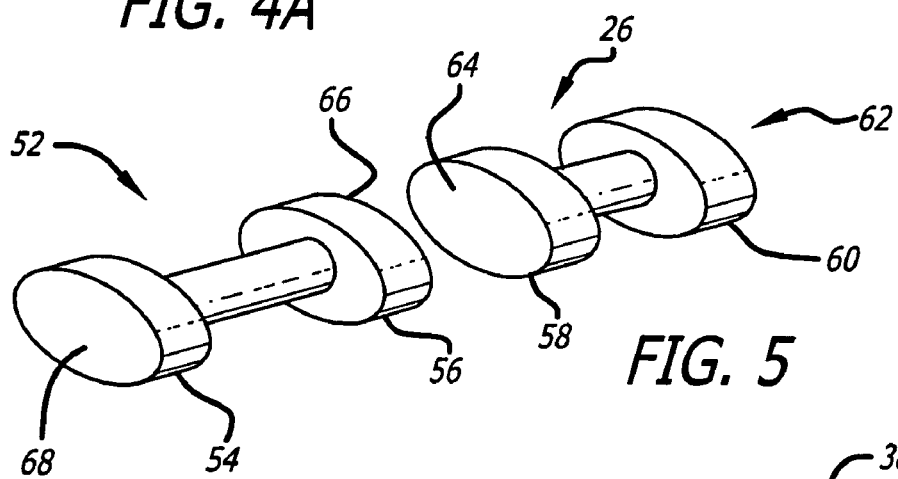
FIG. 5 is a perspective view of aligned magnetic rivets with oval-shaped faces for securing eyewear elements in convertible eyewear in accordance with the invention.

The above-identified spring retention force is complemented by magnetic forces that further the attachment of the optical shield 12 to the frame 10. FIGS. 4A and 4B are cross-sectional views taken at lines 4A—4A and 4B—4B of FIG. 1 for illustrating the magnetic attachment of an optical shield to a frame in accordance with the invention. The cross-sectional view of FIG. 4A shows the means for magnetic force attachment of the center of the shield 12 to the bridge 28 of the frame 10 while FIG. 5 is a perspective view of the aligned magnetic rivets 26 and 52. Viewed together, the two-headed magnetic rivet 52, obscured in previous views by the logo plate 20 that is soldered thereto, is fixed to the shield 12 so that opposed enlarged head portions 54, 56 extend from opposed surfaces of the shield 12. The enlarged head portions 54, 56 of the magnetic rivet 52, as well as enlarged head portions 58, 60 of the magnetic rivet 26, present surfaces 62, 64 and 66, 68 respectively of oval, rather than circular, shapes. Such shapes enable the present invention to maintain proper alignment of the shield 12 (and/or a gasket adapter, an optical insert, discussed below) with respect to the frame 10 even absent the spring force occasioned by flexing of the resilient shield 12 or the additional magnetic attachment forces. Such additional magnetic forces will be seen to result, in part from the presence of the magnetic rivets 36 and 38.

The magnetic rivet 26 is seen to be recessed within the bridge 28 of the frame 10 in a channel 70 whose contour follows the oval contour of the head 58 of the magnetic rivet 26. The magnetic rivets 26 and 52 are arranged with respect to the shield 12 and the bridge 28 so that, when the shield 12 is attached to the frame 10 as illustrated in FIGS. 1 and 3, the rivets 26 and 52 attain the mating relationship illustrated in FIG. 4A. The two rivets 26, 52 are poled (indicated be the letters "N" and "S" representing opposite magnetic polarities) so that their contacting surfaces are of opposite magnetic polarities.

Figure 6:
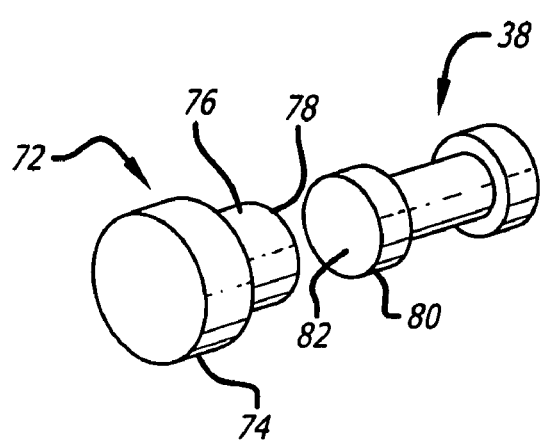
FIG. 6 is a perspective view of aligned magnetic rivets with circular-shaped faces for securing eyewear elements in convertible eyewear in accordance with the invention.

The arrangement for attaining magnetic coupling at the edges of the shield 12 to the frame 10 is illustrated in FIG. 4B, a cross section view taken at line 4B—4B of FIG. 1 and FIG. 6, a perspective view for illustrating aligned magnetic rivets 38, 72 that provide the force for magnetically securing the edges of the shield 12 to the frame 10. Viewing FIGS. 4A and 4B together, certain similarities are apparent in the arrangement for attachment of the edge portions of the shield 12 to the central browline member 14 that were observed with reference to the magnetic attachment of the central portion of the shield 12 to the bridge 28 of the frame 10. As can be seen, the magnetic rivets 72, 38 are arranged with respect to the browline member 14 and the shield 12 respectively so that, when the shield 12 is aligned with the frame 10, the rivets are in contacting relationship. The magnetic rivet 72 includes an enlarged head 74 that is embedded within the browline member 14 to prevent the magnet from popping out of the molded frame. The head 74 is integral with a shaft 76 having a face 78 for contacting an enlarged end portion 80 of the dumbell-shaped magnetic rivet 38. As in the case of the magnetic attachment of the shield 12 to the bridge 28, the contacting surfaces 66, 64 of the magnetic rivets 52 and 26 respectively are of opposite magnetic polarities.

The enlarged ends of the magnetic rivet 38 protrude from the surfaces of the shield while the magnetic rivet 72 is embedded within the browline member 14 with the surface 78 recessed within a channel 84. The channel 84 is of like dimension to the shaft 76 of the magnetic rivet 72 which is, in turn, identical to that of the contacting end portion 80 of the magnetic rivet 38. Unlike the contacting faces of the magnetic rivets for securing the shield 12 to the bridge 28, the contacting faces 78, 82 of the magnetic rivets 72 and 38 respectively may be circular. Such a shape is permissible as the multiple (two) points of magnetic force attachment are made between the edges of the shield 12 (and/or a goggle adapter, disclosed below) and the frame 10. Unlike the case of the oval-shaped magnetic rivets that secure the central portion of the shield 12, the presence of two points of magnetic attachment near the edges of the shield 12 assures that it will be maintained in proper alignment with respect to the frame 10. That is, multiple points of magnetic attachment is an alternative to a single, oval-shaped magnetic attachment seated in a like-shaped (oval) channel. In the latter situation, the oval shape of the channel prevents rotation and resulting misalignment of the shield 12 (and/or a goggle adapter, an optical insert as discussed below) with respect to the frame 10.

Figure 7A:
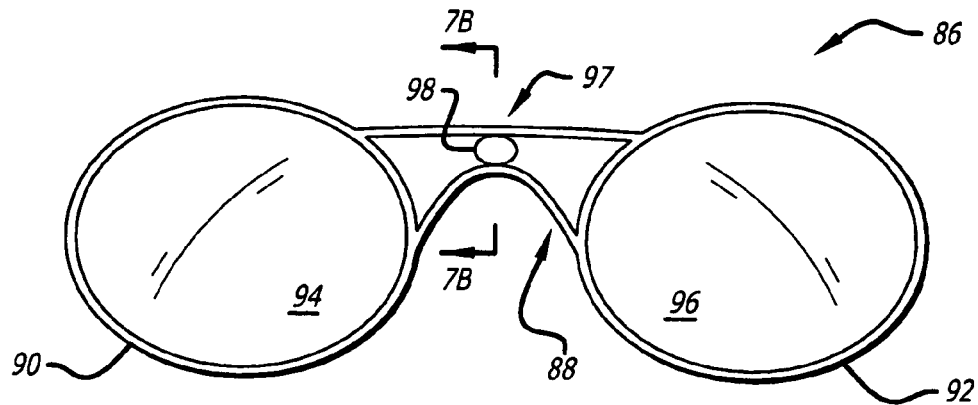
FIGS. 7A and 7B are front planar and side sectional views respectively of a prescription lens insert for use in convertible eyewear in accordance with the invention.
Figure 7B:
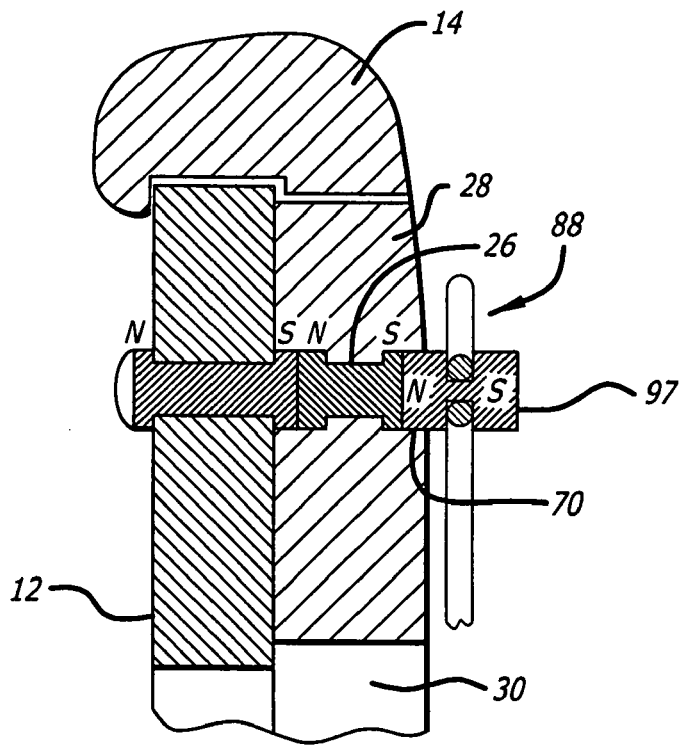

FIGS. 7A, 7B, and 8A through 8C illustrate devices that are readily compatible with the eyewear of the invention. Such devices permit conversion to other optical modes. FIG. 7A is a front elevation view of an insert 86 for converting the eyewear of the invention to a prescription optical device. The insert 86 comprises a frame 88 that includes mounts 90, 92 for receiving prescription lenses 94, 96 respectively. A magnet 97 having an oval-shaped face 98 of opposite magnetic polarity to the face 62 of the magnetic rivet 26 that is recessed within the bridge 28 of the frame 10, is fixed to the upper central portion of the frame 88. The magnet 97 is of the same type as the magnet 26, comprising opposed enlarged end portions, each terminating in an oval-shaped face, separated by a central portion of lesser cross-sectional dimension. As shown in FIG. 7B, a side sectional view that illustrates the attachment of the frame 88 of the prescription insert 86 to the frame 10, such magnetic rivet configuration enables the magnetic rivet 97 to be securely fitted to the frame 88. The oval-shaped face 98 of the magnetic rivet 97 protrudes a sufficient amount beyond the front of the frame 88 to be received within the similarly-shaped channel 70 at the rear of the bridge 28. As illustrated in FIG. 4A, the exposed surface 62 of the magnetic rivet 26 is recessed into such channel 70. The design of the prescription insert 86 permits the ready attachment of the shield 12 and the insert 86 to opposed sides of the frame 10 to thereby provide ready conversion to (and from) a prescription optical device. The oval shapes of contacting surfaces of the magnetic rivets 26 and 97, as well as the oval channel 70 into which the magnetic rivet 26 is recessed, permits magnetic attachment of the insert 86 to the frame 10 at a single point without risk of rotation of the insert with respect to the frame 10. This greatly simplifies the process of converting the eyewear to an optical prescription.

Figure 8A:
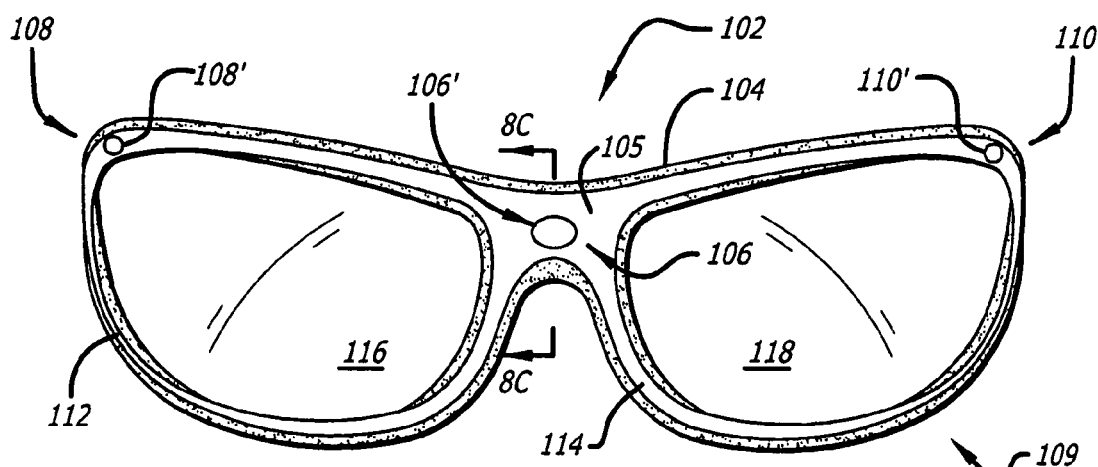
FIGS. 8A through 8(c) are front planar, top and side sectional views respectively of a goggle adapter for use in convertible eyewear in accordance with the invention.
Figure 8B:
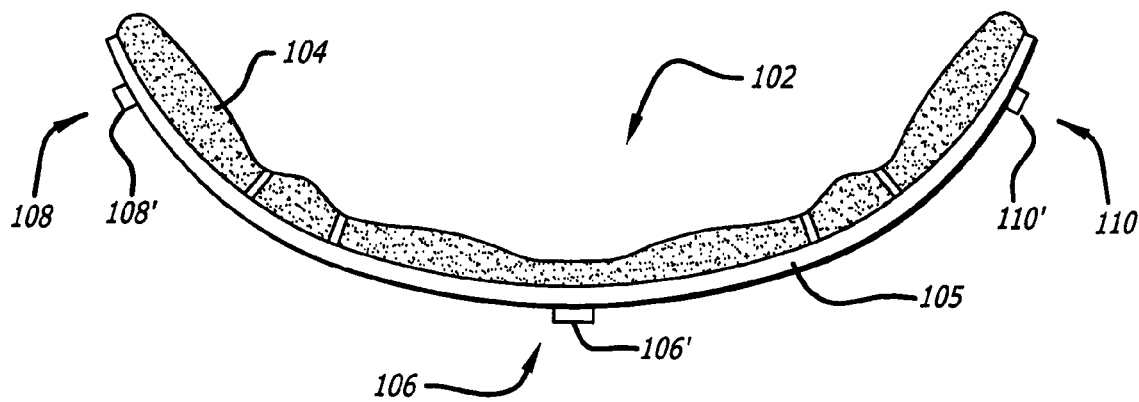
Figure 8C:
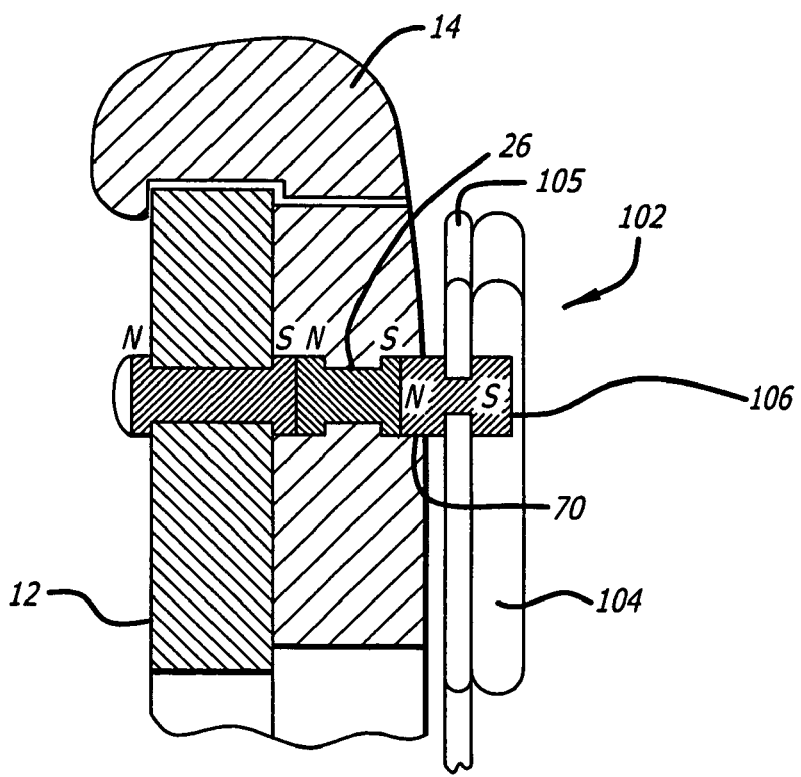

FIGS. 8A through 8C are front elevation, top and side sectional views of a goggle attachment 102 for conversion of the invention into goggles in which a padded gasket 104, fixed to a plastic frame 105, is provided for sealing the eyewear to the face of a wearer. A central magnet 106 has an oval-shaped face 106' that protrudes beyond the central portion of a frame 109 of plastic or like material while magnets 108, 110 have circular faces 108', 110' respectively that protrude from edge portions of the frame 109. The frame 109 includes a pair of mounts 112, 114 for receiving lenses 116, 118 respectively. Such lenses may be of the optical prescription or non-prescription type. As illustrated in the side sectional view of FIG. 8C, the combination of oval shapes of the contacting magnetic rivets 26 and 106, as well as the oval shape of the channel 70 of the frame 10 into which the magnetic rivet 26 is recessed, permit ready affixation of the goggle adapter 102 to the frame 10 by means of a single point of magnetic contact without risk of rotation therebetween.

The rivets 108, 110 arranged near opposed edges of the frame 109 of the adapter 102 provide either a complementary or alternative means for attaching the adapter to the frame 10. Each of the magnetic rivets 108, 110 is arranged to couple to the frame 10 in a manner that is analogous to the magnetic coupling of the magnetic rivets 36, 38 having circular faces that are fixed to the shield 12. As illustrated in FIG. 4B, which illustrates the magnetic coupling of an edge magnet 38 of the shield 12 to a magnetic rivet 72 embedded within an aligned portion of the browline 14 of the frame 10, a circular face 108' or 110' of a magnet fixed to and protruding forwardly from an edge portion of the adapter frame 109, is received within the channel 84 to contact the oppositely magnetically-poled face of the magnet 72. Unlike the magnetic rivet 38, each of the magnetic rivets 108 and 110 is shaped like the magnetic rivet 72 with its enlarged portion (corresponding to the enlarged portion 74 is of the magnetic rivet 72) molded within the frame 109 to thereby secure the magnetic rivet from popping out of the adapter frame 109.

As mentioned above, the magnetic rivets 108, 110 may be employed to provide an additional means for fixation of the adapter 102 to the frame 10 when employed in combination with the means for attachment provided by the central magnetic rivet 106. Alternatively, the magnetic rivets 108, 110 may be employed to provide a means for ready attachment and detachment of the adapter 102 to the frame 10 in the absence a centrally-located magnetic rivet 106 of oval shape. By providing two points of magnetic attachment, the paired magnetic rivets 108 prevent undesired rotation of the adapter 102 with respect to the frame 10, with or without the presence of a third point of magnetic attachment provided by the magnetic rivet 106.

Thus, the preceding figures illustrate the manner in which secure attachment of shield 12 and frame are accomplished in eyewear 10 in accordance with the invention. While the invention has been illustrated in the context of eyewear that includes a single-piece shield, it will be seen below that the teachings of the invention may be adapted to other types of eyewear, rendering such eyewear convertible between a plurality of configurations.

While this invention has been described with reference to its presently-preferred embodiment, it is not limited thereto. Rather, this invention is limited only insofar as it is defined by the following set of patent claims and includes within its scope all equivalents thereof.

What is claimed is:

1. Convertible eyewear comprising, in combination:
   a) a frame;
   b) an optical shield, said optical shield being arranged to be received in said frame;
   c) each of said frame and said shield having at least one magnetic rivet fixed thereto;
   d) each of said magnetic rivets having at least one exposed planar surface;
   e) said magnetic rivets of said frame and said shield being arranged so that, when said shield is received in said frame, an exposed planar surface of a magnetic rivet fixed to said frame having a first magnetic polarity contacts an exposed planar surface of a magnetic rivet fixed to said shield having the opposite magnetic polarity; and
   f) a magnetic rivet recessed within said frame including planar surfaces of opposite magnetic polarities exposed at the front and back of said frame.

2. Convertible eyewear as defined in claim 1 wherein said at least one magnetic rivet fixed to said shield includes a planar surface that protrudes beyond a surface of said shield.

3. Convertible eyewear as defined in claim 2 wherein said frame and said shield are arranged so that a surface of at least one magnetic rivet of a first magnetic polarity that protrudes from a surface of said shield is aligned to contact a surface of opposite magnetic polarity of a magnetic rivet recessed within said frame.

4. Convertible eyewear as defined in claim 3 further characterized in that:
   a) at least one magnetic rivet fixed to said shield has an exposed planar surface of oval shape having a first magnetic polarity;
   b) said exposed planar face of said magnetic rivet is recessed within an oval-shaped channel; and
   c) said aligned magnetic rivet protruding from a surface of said shield has an oval-shaped planar surface of opposite magnetic polarity.

5. Convertible eyewear as defined in claim 4 further including:
   a) said frame comprising an elongated browline element and a nose bridge, said nose bridge being centrally fixed with respect to the length of said bridge;

b) said shield including a central region joining optical areas; and c) said magnetic rivet having an exposed planar surface of oval shape being recessed within a channel of oval shape located within said nose bridge; and d) said magnetic rivet having a planar face of oval shape protruding from a surface of said shield being located within, said central region of said shield.

6. Convertible eyewear as defined in claim 5 further including:

a) at least one magnetic rivet recessed said browline element;

b) a magnetic rivet including a portion that protrudes from a surface of said frame being located within an optical region of said frame, said magnetic rivet being aligned with said magnetic rivet recessed within said browline element.

7. Convertible eyewear as defined in claim 6 wherein:

a) said magnetic rivet recessed within said browline element has an exposed planar surface of a first magnetic polarity of circular shape recessed with a channel of cylindrical shape; and b) said aligned magnetic rivet protruding from a surface of said shield has a planar surface of opposite magnetic polarity of circular shape arranged to contact said planar surface of said magnetic rivet recessed within said browline.

8. Convertible eyewear as defined in claim 4 further including:

a) a prescription lens insert;

b) said insert comprising a insert frame including mounts for receiving prescription lenses;

c) a magnetic rivet fixed to said insert frame, said magnetic rivet having a planar surface of said first magnetic polarity;

d) said magnetic rivet being arranged to be aligned with said magnetic rivet recessed within said frame of said eyewear;

e) said planar surface of said magnetic rivet being of oval shape and protruding from said insert frame to contact a surface of said magnetic rivet of opposite magnetic polarity recessed within said frame of said eyewear.

9. Convertible eyewear as defined in claim 4 further including:

a) a goggle adapter comprising a padded frame; and b) at least one magnetic rivet fixed to said padded frame, said at least one magnetic rivet having a planar surface of said first magnetic polarity;

c) said at least one magnetic rivet being arranged to be aligned with at least one magnetic rivet recessed within said frame of said eyewear.

10. Convertible eyewear as defined in claim 9 comprising said planar surface of said magnetic rivet being of oval shape and protruding from said padded frame to contact a surface of a magnetic rivet of opposite magnetic polarity recessed within said frame of said eyewear.

11. Convertible eyewear as defined in claim 9 comprising said planar surfaces of two magnetic rivets being of circular shape and protruding from said padded frame to contact surfaces of magnetic rivets of opposite polarity recessed within said frame of said eyewear.

\* \* \* \* \*